United States Patent [19]
Zankl

[11] 4,039,056
[45] Aug. 2, 1977

[54] BRAKE SHOE ASSEMBLY

[76] Inventor: Robert H. Zankl, 10735 SW. 58th Ave., Miami, Fla. 33173

[21] Appl. No.: 574,578

[22] Filed: May 5, 1975

[51] Int. Cl.² .................................................. F16D 51/24
[52] U.S. Cl. .................................. 188/325; 72/256; 92/129; 92/187; 188/250 F; 188/364; 403/76; 403/125
[58] Field of Search ............... 188/325, 326, 327, 328, 188/331, 333, 334, 335, 336, 337, 364, 363, 362, 250 A, 250 F, 250 B, 250 H, 250 D; 192/107 T; 92/129, 187, 57; 403/76, 122, 124, 125; 29/DIG. 47; 72/253, 254, 256

[56] References Cited
U.S. PATENT DOCUMENTS

| | | | |
|---|---|---|---|
| 1,733,186 | 10/1929 | Down | 188/364 X |
| 1,796,986 | 3/1931 | Ferris | 92/129 X |
| 1,956,979 | 5/1934 | Carlson | 188/364 X |
| 2,143,458 | 1/1939 | Sinclair | 188/250 F X |
| 2,161,640 | 6/1939 | Schnell | 188/327 |
| 2,616,528 | 11/1952 | Swanson | 192/107 T X |
| 2,629,463 | 2/1953 | Freeman | 188/364 |
| 3,451,315 | 6/1969 | Rumsey | 92/187 X |
| 3,473,636 | 10/1969 | Sand | 188/250 A |
| 3,687,247 | 8/1972 | Bricker et al. | 188/335 |
| Re. 27,339 | 4/1972 | Dornbos | 29/DIG. 47 |

Primary Examiner—George E. A. Halvosa
Attorney, Agent, or Firm—Ernest H. Schmidt

[57] ABSTRACT

Integrally formed brake shoe for use with cylindrical automotive brake drums in hydraulic brake systems are fabricated by bending and shaping sections of extruded lengths of the material having a T-shaped cross-sectional configuration. Connector pins for transmitting brake actuating forces between the hydraulic cylinder pistons and the brake shoes are concavely rounded at their piston abutting ends, and either concavely or convexly rounded at their brake shoe abutting ends, for face-to-face sliding contact with complemental abutting surface portions, respectively, of the hydraulic pistons and brake shoes.

1 Claim, 6 Drawing Figures

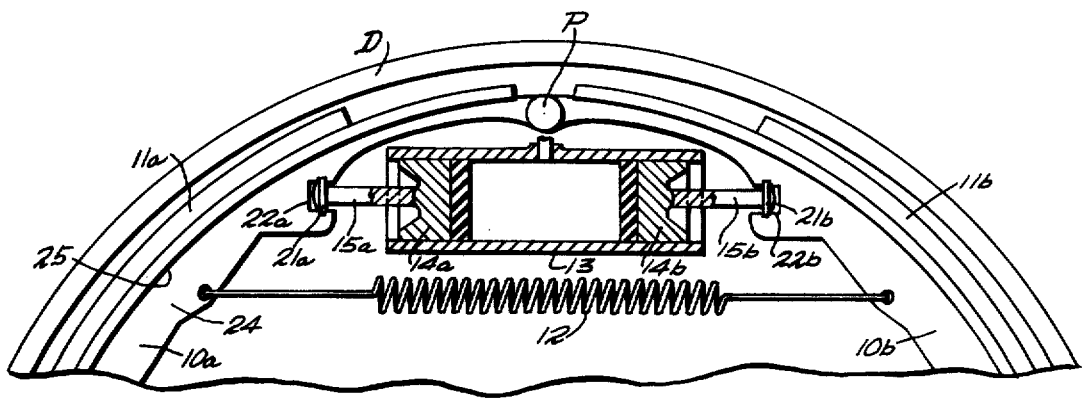
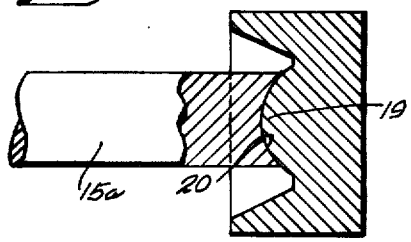
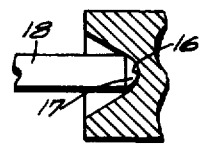
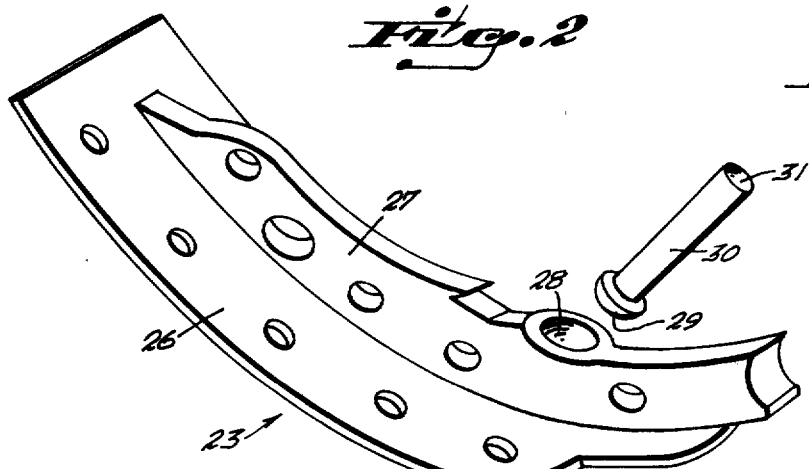
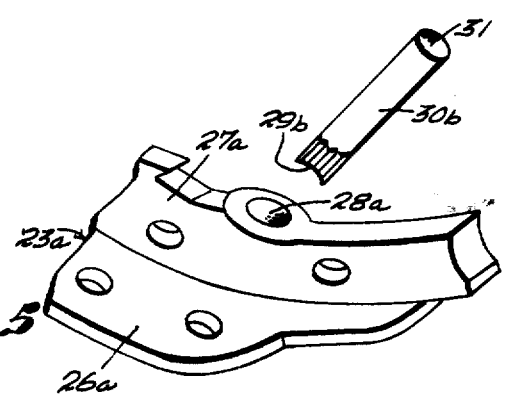

BRAKE SHOE ASSEMBLY

This invention relates to automotive brake assemblies, and is directed particularly to improvements in brake shoe construction and the actuating pins used in association with the brake shoes in hydraulic automotive brake systems.

In conventional cylindrical drum and arcuate brake shoe assemblies actuated by a hydraulic system including individual wheel hydraulic cylinders, the opposing brake shoes are fabricated or welded-together steel brake lining support plate and inside web parts. The interlinking actuating pins used with such steel fabricated brake shoes are formed with a slotted "H" head at one end for pivotal connection at an interfitting slot in the shoe web portion and, at the other end, with a convexly-rounded portion adapted to seat within a complemented, concavely-rounded recess in the outer end of the associated wheel cylinder piston.

Such conventional construction in brake shoe actuating pins has the disadvantage that whereas one of the headed ends can readily be formed on a cold header machine through which steel wire is automatically cut, headed and trimmed, to achieve the spheroidal or convex shape at the opposite end of the pin with the required precision, necessitates a secondary turning or shaving operation. This has been necessary to obtain full, surface-to-surface mating with the usual concave recess of an associated hydraulic cylinder piston.

It is, accordingly, the principal object of this invention to provide a novel and improved brake shoe assembly which obviates the above described deficiencies of brake shoe actuating pins heretofore devised by modifying the associated hydraulic cylinder pistons to present a spheroidal protrusion or convexity as the pin contacting or abutting element, thereby enabling the use of a mating concavity at the inner or hydraulic piston end of the pin, which concavity can be simply and inexpensively produced with the required precision on a cold header, at a substantial savings in time and cost as compared with machine turning or shaving.

Another object of the invention is to provide an improved brake shoe which is particularly well suited for use in association with the above-described convexly-ended brake shoe actuating pin, and which can be integrally fabricated of extruded metal, such as of an aluminum alloy, for inexpensive manufacture as compared with welded steel or aluminum brake shoes of the type heretofore used.

Still another object of the invention is to provide an improved extruded metal brake shoe of the above nature which will be more efficient in the conduction and dissipation of the heat of friction developed in the associated brake linings during wheel braking operations, as compared with ordinary welded steel brake shoes heretofore known.

Other objections, features and advantages of the invention will be apparent from the following description when read with reference to the accompanying drawings. In the drawings, wherein like reference numerals denote corresponding parts throughout the several views:

FIG. 1 is a fragmentary side elevational view, partly in cross-section, of a brake shoe assembly embodying the invention;

FIG. 1a is a fragmentary view illustrating details of prior art piston pin connecting mechanism between a hydraulic brake cylinder piston and its associated brake shoe;

FIG. 2 is a fragmentary view, on an enlarged scale and partly in cross-section, illustrating details of the piston pin connecting mechanism between one of the hydraulic pistons and its associated brake shoe;

FIG. 3 is a perspective view of a modified form of brake shoe embodying the invention, shown in "exploded" relation with respect to its associated piston connector pin;

FIG. 4 is a side view, partly in cross-section of a modified form of piston connector pin suitable for use with the brake shoe of FIG. 3; and FIG. 5 is a partial view, similar to that of FIG. 3 but illustrating a modified form of brake shoe and associated piston connector pin.

Referring now in detail to the drawings, reference numeral 10 in FIG. 1 designates generally, one form of brake shoe assembly embodying the invention, the same being illustrated in association with a typical automotive brake drum cylinder. The brake shoe assembly 10 comprises a pair of ordinary brake shoes 10a, 10b, the outer arcuate surfaces of which carry the usual brake bands 11a, 11b, respectively. The brake shoes 10a, 10b have opposing ends thereof abuttingly disposed with respect to a fixed pin P within the brake drum D, and have outer end portions interconnected by a tension spring 12 serving to maintain the associated brake bands 11a, 11b in slightly withdrawn position with respect to inner surface areas of said brake drum. A hydraulic cylinder 13 fixed with respect to the vehicle chassis has a movable piston 14a, 14b at each end, which pistons interlink with brake shoes 10a, 10b through shoe-actuating pins 15a, 15b, respectively. In operation, it will be understood that as the hydraulic pressure within the hydraulic cylinder 13 is increased upon depression of the vehicle brake peddle, the opposing hydraulic pistons 14a, 14b will be forced outwardly, thereby urging the brake shoes 10a to 10b outwardly, the braking forces being transmitted through the respective actuating pins 15a, 15b. The associated brake shoes 11a, 11b will thereby be brought into frictional contact with the interior cylindrical surface of the brake drum D, serving to frictionally brake the vehicle wheel associated with said brake drum.

Whereas the hydraulic cylinder pistons 14a, 14b will be constrained to linear or translatory movement within the hydraulic cylinder 13, it will be understood from the foregoing that, because of the pivotal movement to be imparted thereby through actuating pins 15a, 15b, the inner ends of said pins, that is, the ends abutting their respective hydraulic cylinder pistons 14a, 14b, must be free to depart slightly from coaxial movement with respect to the pistons during braking and brake release. Such relative movement is conventionally provided for by fabricating the outer ends of the hydraulic pistons with rounded sockets 16 (see prior art FIG. 1a) within which a correspondingly rounded end portion 17 of an ordinary brake-actuating pin 18 fitted. A salient feature of the present invention resides in the provision, in the outer ends of each of the wheel cylinder pistons 14a, 14b, of a convex protrusion 19 (see FIG. 2) serving as an abutting locating element cooperative with a complementary concavity 20 formed at the inner end of the actuating pins 15a, 15b.

As best illustrated in FIG. 2, the segmental extent of the convex protrusion 19 is somewhat greater than that of the concavity 20 in the associated actuating pin 15a, 15b to permit the limited universal movement required of said actuating pins with respect to their associated hydraulic piston.

FIG. 1 further illustrates, at the outer ends of the actuating pins 15a, 15b, the conventional "H" head 21a, 21b, for linkage within conventional rectangular recesses 22a, 22b, formed in the respective brake shoes 10a, 10b.

Reference numeral 23 in FIG. 3 designates, generally, a novel and improved brake shoe embodying the invention, said brake shoe being integrally formed of extruded metal, such as an aluminum alloy, instead of being fabricated by welding a steel web portion 24 centrally against the inside of an arcuate, brake lining support plate structure 25, (see FIG. 1) as heretofore done. As illustrated in FIG. 3 the improved brake shoe is extruded as straight lengths of the metal having a T-shaped cross-sectional configuration to provide the integrally formed brake lining support plate portion 26 and web or backing portion 27, which extrusions are subsequently cut into appropriate lengths and arcuately bent and shaped to the desired curvature, after which the web or backing portions can be contoured and perforated by the employment of appropriate punch press operations or the like. The use of an extruded aluminum alloy brake shoe 23 having a comparatively thicker web or backing portion 27 not only provides for more rapid heat dissipation from the associated brake lining as compared with ordinary welded-together steel plate brake shoes, but also lends itself readily to the simplified and improved method of linkage with the outer ends of actuating pins actuated by the improved hydraulic pistons 14a, 14b, for example, of FIG. 1. Thus, as illustrated in FIG. 3, the outer, comparatively thick edge of the web or backing portion 27 of the brake shoe 23 can readily be stamped, at an appropriate position therealong, with a spheroidal concavity 28 adapted for the abutting reception therein, for linkage, of a complementary increased-diameter, rounded head portion 29 of an actuating pin 30. The opposite (hydraulic cylinder) end of the actuating pin 30 is formed with a concavity 31, which is preferably identical with the concavities 20 at the inner ends of the actuating pins 15a, 15b, of FIG. 1 for the use and purposes as described above.

FIG. 4 illustrates a modification of the actuating pin 30, designated by reference numeral 30a, wherein the outer or convexly round end, instead of being headed to an increased diameter, is merely rounded, as indicated at 29a.

FIG. 5 illustrates a modification of the extruded brake shoe 23 illustrated in FIG. 3, designated by reference numeral 23a, wherein the integrally formed web or backing portion 27a, instead of being stamped with a spheroidal concavity, is formed as by stamping with a spheroidal projection 28a, and wherein the cooperative actuating pin 30b, while otherwise conforming with the actuating pins 30 and 30a described above, is formed at its outer or brake shoe end with a concavity 29b of complementary or conforming shape with respect to the spheroidal projection 28a and which may, for example, be identical with the concavity 31 at the opposite or hydraulic cylinder piston end of the pin.

An important advantage of the novel brake shoe assembly herein described resides in the fact that the actuating pins, not being convexly headed at each end, do not require a secondary turning operation, and can therefore be manufactured more economically than actuating pins heretofore devised.

Another advantge is that not only can the extruded brake shoe assembly comprising the invention be more economically produced than welded together steel brake shoes heretofore known and widely used in the industry, but they are substantially more efficient in dissipating the heat of friction normally generated during braking.

Still another advantage is that the extruded brake shoe assembly is well adapted to cooperative use with actuating pins having an outer end contour that is either convex or concave.

While I have illustrated and described herein only four forms in which my invention can conveniently be embodied in practice, it is to be understood that these embodiments are presented by way of example only and not in a limiting sense. My invention, in brief comprises all the embodiments and modifications coming within the scope and spirit of the following claims.

What I claim as new and desire to secure Letters Patent is:

1. In a brake shoe assembly for use in cylindrical automotive brake drums in hydraulic brake systems including a pair of brake shoes, a common hydraulic brake wheel cylinder having opposed actuating pistons, and actuating pins extending between abutting surface portions of the pistons and associated brake shoes, the improvement comprising, a spheroidal, concavely-rounded end surface formed at the piston end of each of the actuating pins and complementary protrusions at the outer ends of each of the hydraulic cylinder actuating pistons for face-to-face sliding abutment contact with said concavely-rounded end surfaces, said actuating pins being of unitary, integral construction, each of the brake shoes being integrally formed with a substantially flat, arcuately-bent brake lining support plate portion of uniform thickness and a web portion of substantially greater uniform thickness extending centrally outwardly of and along the inside of said arcuate support plate portion, each of said actuating pins, at their brake shoe ends, having a spheroidal, convexly-rounded end surface, said web portions of each of said brake shoes being integrally formed with a sphereoidal concavity for face-to-face sliding abutment contact therewith of said convexly-rounded end surfaces of said actuating pins.

* * * * *